US009188010B2

(12) United States Patent
Jha et al.

(10) Patent No.: US 9,188,010 B2
(45) Date of Patent: Nov. 17, 2015

(54) SYSTEMS AND METHODS TO CONTROL FLOW IN A ROTOR WHEEL

(75) Inventors: Sanjeev Kumar Jha, Bangalore (IN);
Sheo Narain Giri, Bangalore (IN);
Bhaskar Pemmi, Bangalore (IN);
Harish Bommanakatte, Bangalore (IN);
Rajesh Achudhan, Bangalore (IN)

(73) Assignee: General Electric Company, Schenectady ( * ) Notice: Subject to any disclaimer, the term of this patent is extended or adjusted under 35 U.S.C. 154(b) by 736 days.

(21) Appl. No.: 13/532,470

(22) Filed: Jun. 25, 2012

(65) Prior Publication Data
US 2013/0343868 A1 Dec. 26, 2013

(51) Int. Cl.
F01D 5/08 (2006.01)
F04D 29/02 (2006.01)
F04D 29/58 (2006.01)
F04D 29/32 (2006.01)
F02C 7/057 (2006.01)

(52) U.S. Cl.
CPC ............... *F01D 5/087* (2013.01); *F02C 7/057* (2013.01); *F04D 29/023* (2013.01); *F04D 29/321* (2013.01); *F04D 29/584* (2013.01); *F05D 2300/505* (2013.01)

(58) Field of Classification Search
CPC ......... F01D 5/081; F01D 5/082; F01D 5/085; F01D 5/087; F04D 29/2216; F04D 29/2211; F04D 29/2255; F04D 29/242; F04D 29/245; F04D 29/28; F04D 29/30; F04D 29/584; F05D 2300/505
See application file for complete search history.

(56) References Cited

U.S. PATENT DOCUMENTS

| 2,618,433 | A | * | 11/1952 | Loos et al. ............... 415/115 |
| 4,919,590 | A | * | 4/1990 | Stratford et al. ........... 415/116 |
| 6,351,937 | B1 | * | 3/2002 | Matsuda et al. ............. 60/805 |
| 6,485,255 | B1 | | 11/2002 | Care |
| 8,556,584 | B2 | * | 10/2013 | Mallaiah et al. ........... 416/185 |
| 8,678,753 | B2 | * | 3/2014 | Farrell ..................... 415/126 |
| 2003/0133788 | A1 | | 7/2003 | Avignon et al. |
| 2009/0180885 | A1 | * | 7/2009 | Rajarajan et al. ........ 416/204 A |
| 2009/0226327 | A1 | | 9/2009 | Little |

(Continued)

FOREIGN PATENT DOCUMENTS

EP 2455584 A1 5/2012
GB 2207465 A 2/1989

(Continued)

OTHER PUBLICATIONS

Search Report from EP Application No. 13171616.9 dated Oct. 25, 2013.

*Primary Examiner* — Edward Look
*Assistant Examiner* — Christopher R Legendre
(74) *Attorney, Agent, or Firm* — Sutherland Asbill & Brennan LLP

(57) ABSTRACT

Embodiments of the present application include a gas turbine system. The system may include a rotor wheel and one or more impeller vanes radially disposed on the rotor wheel. The system may also include one or more fluid passages defined by adjacent impeller vanes. The one or more fluid passages may be radially disposed across the rotor wheel. Moreover, the system may include one or more shape memory alloy valves disposed within each of the fluid passages. The one or more shape memory alloy valves may be configured to change shape to control a flow of fluid through the fluid passages.

20 Claims, 4 Drawing Sheets

(56) References Cited

U.S. PATENT DOCUMENTS

| | | | |
|---|---|---|---|
| 2012/0128473 A1* | 5/2012 | Szwedowicz et al. | 415/180 |
| 2012/0219405 A1* | 8/2012 | Szwedowicz et al. | 415/173.3 |
| 2013/0343868 A1* | 12/2013 | Jha et al. | 415/1 |
| 2014/0109580 A1* | 4/2014 | Giri et al. | 60/728 |
| 2015/0083281 A1* | 3/2015 | Lipkin et al. | 148/563 |

FOREIGN PATENT DOCUMENTS

| | | | |
|---|---|---|---|
| GB | 2354290 A | | 3/2001 |
| JP | 2009203982 A | * | 9/2009 |

* cited by examiner

SYSTEMS AND METHODS TO CONTROL FLOW IN A ROTOR WHEEL

FIELD OF THE DISCLOSURE

Embodiments of the present application relate generally to gas turbine engines and more particularly to systems and methods to control a flow in a rotor wheel.

BACKGROUND OF THE DISCLOSURE

Gas turbines are widely used in industrial and commercial operations. A typical gas turbine includes a compressor at the front, one or more combustors around the middle, and a turbine at the rear. The compressor imparts kinetic energy to the working fluid (e.g., air) to produce a compressed working fluid at a highly energized state. The compressed working fluid exits the compressor and flows to the combustors where it mixes with fuel and ignites to generate combustion gases having a high temperature and pressure. The combustion gases flow to the turbine where they expand to produce work. For example, expansion of the combustion gases in the turbine may rotate a shaft connected to a generator to produce electricity.

The compressor and the turbine typically share a common rotor which extends from near the front of the compressor, through the combustor section, to near the rear of the turbine. The rotor typically is configured to direct a portion of the working fluid through one or more cooling flow passages to cool various components of the gas turbine. The cooling flow passages, however, are configured for base load conditions.

BRIEF DESCRIPTION OF THE DISCLOSURE

Some or all of the above needs and/or problems may be addressed by certain embodiments of the present application. According to one embodiment, there is disclosed a gas turbine system. The system may include a rotor wheel having one or more impeller vanes radially disposed on the rotor wheel. The system may also include one or more fluid passages defined by adjacent impeller vanes. The one or more fluid passages may be radially disposed across the rotor wheel. Moreover, the system may include one or more shape memory alloy valves disposed within each of the fluid passages. The one or more shape memory alloy valves may be configured to change shape to control a flow of fluid through the fluid passages.

According to another embodiment, there is disclosed a gas turbine system. The gas turbine system may include a rotor including a number of rotor wheels. The system may also include one or more impeller vanes radially disposed on each of the rotor wheels. The system may also include one or more fluid passages defined by adjacent impeller vanes such that the one or more fluid passages are radially disposed across the rotor wheels. Moreover, the system may include one or more shape memory alloy valves disposed within each of the fluid passages. The one or more shape memory alloy valves may be configured to change shape to control a flow of fluid through the fluid passages.

Further, according to another embodiment, there is disclosed a method. The method may include positioning one or more shape memory alloy valves within one or more fluid passages of a rotor wheel. The method may also include regulating a configuration of the shape memory alloy valves to control a flow of fluid through the fluid passages.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE DISCLOSURE

Illustrative embodiments will now be described more fully hereinafter with reference to the accompanying drawings, in which some, but not all embodiments are shown. The present application may be embodied in many different forms and should not be construed as limited to the embodiments set forth herein. Like numbers refer to like elements throughout.

Figure 1:
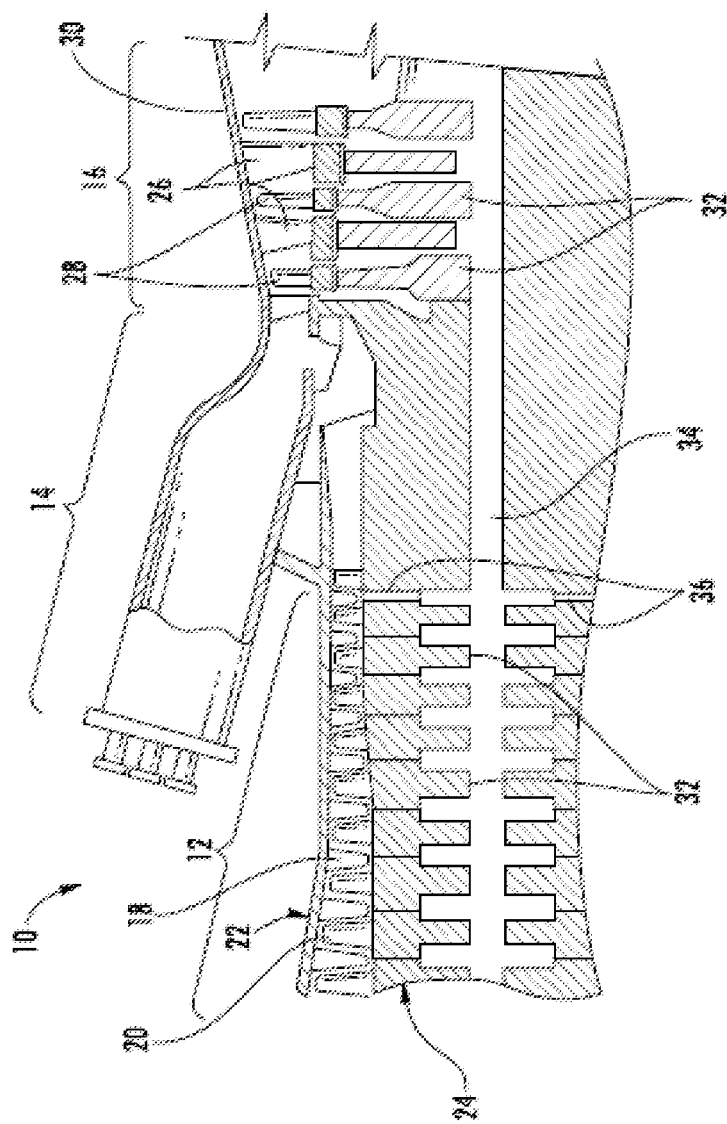
FIG. 1 is an example cross-section of a gas turbine, according to an embodiment.

FIG. 1 provides a cross-section view of an exemplary gas turbine 10 to illustrate various embodiments herein. As shown, the gas turbine 10 may generally include a compressor 12, one or more combustors 14 downstream from the compressor 12, and a turbine 16 downstream from the combustors 14. The compressor 12 may generally include alternating stages of axially aligned stator vanes 18 and rotating blades 20. The stator vanes 18 may be circumferentially connected to a compressor casing 22, and the rotating blades 20 may be circumferentially connected to a rotor 24. As the rotor 24 turns, the stator vanes 18 and rotating blades 20 may progressively impart kinetic energy to a working fluid (e.g., air) to produce a compressed working fluid at a highly energized state. The compressed working fluid may then flow to one or more combustors 14 radially arranged around the rotor 24 where it may mix with fuel and ignites to produce combustion gases having a high temperature and pressure. The combustion gases may exit the combustors 14 and flow along a hot gas path through the turbine 16. The turbine 16 may include alternating stages of axially aligned stator vanes 26 and rotating buckets 28. The stator vanes 26 may be circumferentially connected to a turbine casing 30, and the rotating buckets 28 may be circumferentially connected to the rotor 24. Each stage of stator vanes 26 may direct and accelerate the combustion gases onto the downstream stage of rotating buckets 28 to produce work.

As depicted in FIG. 1, the rotor 24 may include a number of rotor bodies or wheels 32 axially aligned and connected to transmit torque between the turbine 16 and the compressor 12. Each rotor body or wheel 32 may include one or more cavities that form an axial bore 34 through the rotor 24. One or more of the adjacent rotor wheels 32 may include a fluid passage 36 that provides fluid communication between the compressor 12 and the bore 34. In this manner, a portion of the compressed working fluid from the compressor 12 may be diverted around or bypass the combustors 14 and supplied directly to the turbine 16 for various reasons. For example, the diverted fluid may be used to pressurize the rotor cavities to produce a desired differential pressure between the rotor cavities and the hot gas path in the turbine 16. Alternately, or in addition, the diverted fluid may be used to provide cooling to various components in the turbine 16.

Figure 2:
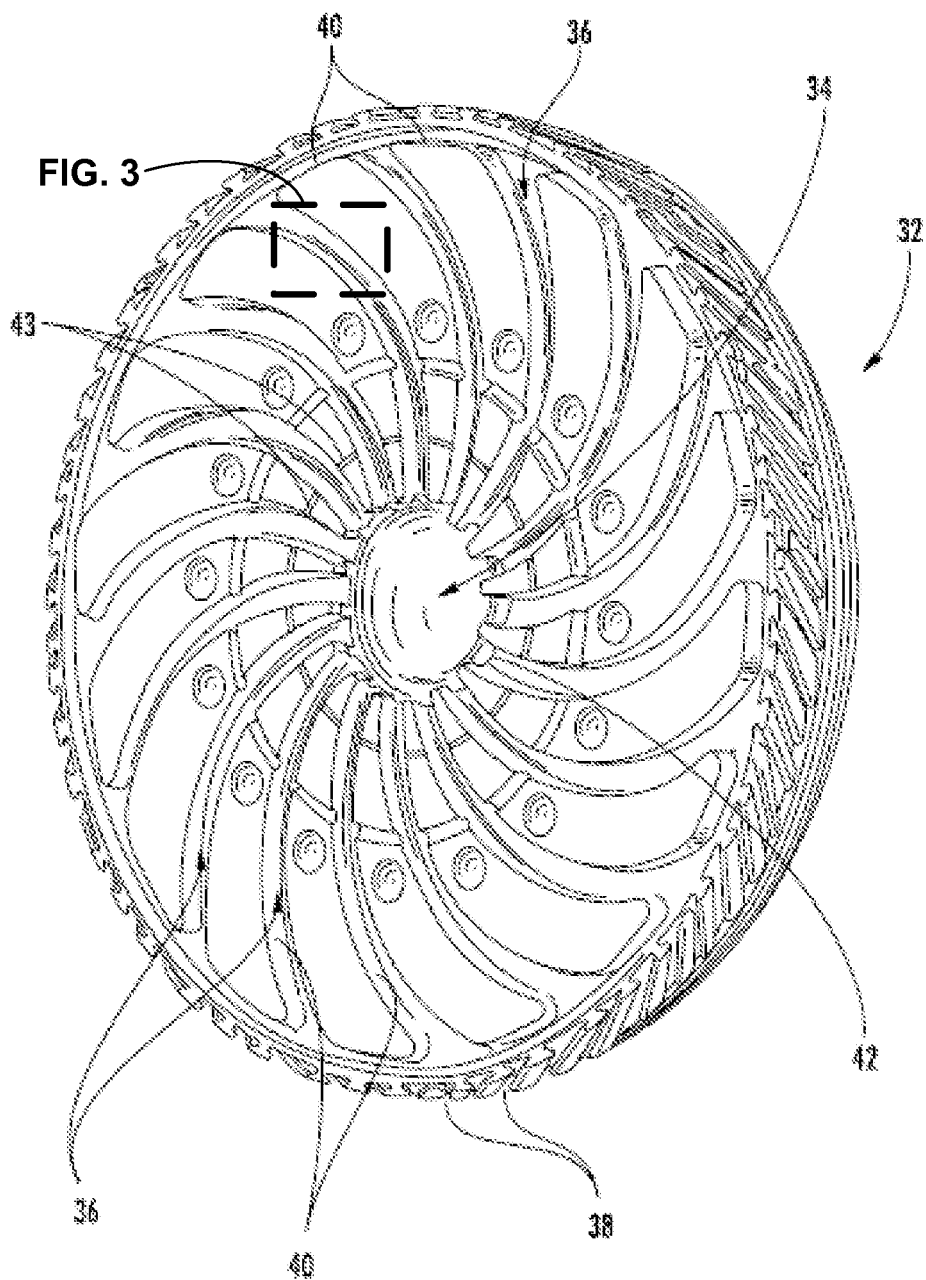
FIG. 2 is an example perspective of a rotor wheel assembly, according to an embodiment.

FIG. 2 depicts a perspective view of the rotor wheel 32 according to one embodiment. As shown, the outer circumference of the rotor wheel 32 may include a number of dovetail slots 38 configured to receive the rotating blades 20. In addition, the radial face of the rotor wheel 32 may include one or more projections or impeller vanes 40 radially disposed on the rotor wheel 32. Each impeller vane 40 may include a first end 42 proximate to the bore 34. Adjacent projections or impeller vanes 40 on the surface of the rotor wheel 32 may define the fluid passages 36 radially across the rotor wheel 32. In this manner, in an example embodiment, as the rotor wheel 32 rotates counter-clockwise as shown in FIG. 2, the impeller vanes 40 may divert a portion of the compressed working fluid through the fluid passages 36 to the bore 34. In some instances, the impeller vanes 40 may include a slit 43.

Figure 3:
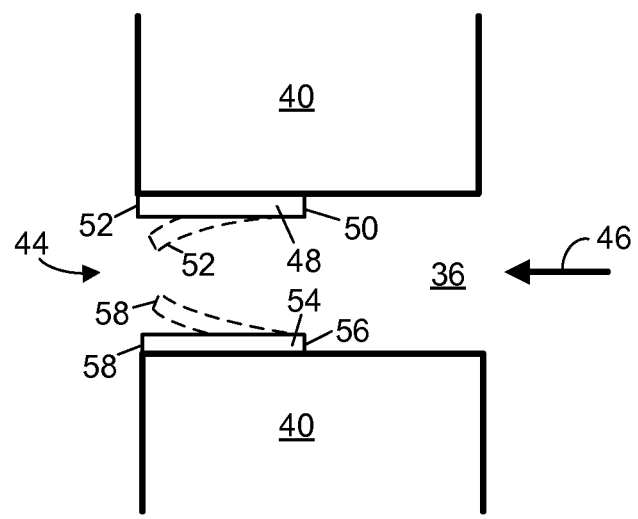
FIG. 3 is an example schematic of a rotor wheel assembly including shape memory alloy valves disposed within a fluid passage, according to an embodiment.

As depicted in FIG. 3, the fluid passage 36 may include a shape memory alloy valve 44. That is, the shape memory alloy valve 44 may be disposed between adjacent impeller vanes 40 and within of the fluid passage 36. The shape memory alloy valve 44 may be configured to change shape to control a flow of fluid 46 through the fluid passage 36. For example, in some instances, the shape memory alloy valve 44 may change shape in response to various load conditions of the gas turbine system, such as a base-load condition or a part-load condition. In other instances, the shape memory alloy valve 44 may change shape in response to various ambient temperature conditions, such as a cold day or a hot day. In yet other instances, the shape memory alloy valve 44 may change shape in response to a temperature of the rotor wheel 32 or other components of the gas turbine engine, such as the compressor, turbine, or the like. Moreover, the shape memory alloy valve 44 may change shape in response to a pressure condition, a humidity condition, and/or a temperature of the flow of fluid 46. In this manner, the shape memory alloy valve 44 may provide an active flow control mechanism within the fluid passage 36 that is response to a number of conditions.

In an embodiment, the shape memory alloy valve 44 may include a first configuration above a transition temperature and a second configuration below the transition temperature. In this manner, the shape memory alloy valve 44 may include one or more predetermined transition temperatures related to a load condition, an ambient temperature, a fluid temperature, a component temperature, a pressure condition, a humidity conditions, or a combination thereof, above or below which the shape memory alloy valve 44 may change shape to control the flow of fluid 46 through the fluid passage 36. The shape memory alloy valve 44 may also include a transition profile (e.g., a chart or graph), wherein the shape memory alloy valve 44 may change shape relative to a load condition, an ambient temperature, a fluid temperature, a component temperature, a pressure condition, a humidity conditions, or a combination thereof. That is, for example, as the load condition or temperature condition changes, the shape memory alloy valve 44 may also concurrently (or close thereto) change shape to regulate the flow of fluid 46.

In certain aspects, the shape memory alloy valve 44 may include a first element 48. The first element 48 may include a fixed end 50 secured about the fluid passage 36. For example, the fixed end 50 may be secured to a wall of the impeller vane 40 or a surface of the fluid passage 36. The first element 48 may also include a free end 52. The free end 52 may be configured to move freely relative to the fixed end 50. In this manner, the first element 48 may include a first configuration (as denoted by the solid lines) and a second configuration (as denoted by the dashed lines). In some instances, as denoted by the dashed lines, the free end 52 may extend into the fluid passage 36 so as to obstruct and/or meter the flow of fluid 46. In other instances, as denoted by the solid lines, the free end 52 may not extend into the fluid passage 36. The shape and metering effect of the first element 48 may be dependent on any number of factors, including, but not limited to, a load condition, an ambient temperature, a component temperature, or the like. For example, the first element 48 may change shape so as to gradually meter (e.g., increase or decrease) the fluid flow 46 as a load condition changes and/or an ambient temperature condition changes.

In certain aspects, the shape memory alloy valve 44 may include a second element 54. The second element 54 may be disposed opposite of the first element 48. Like the first element 48, the second element 54 may include a fixed end 56 secured about the fluid passage 36. The second element 54 may also include a free end 58. In this manner, the second element 54 may include a first configuration (as denoted by the solid lines) and a second configuration (as denoted by the dashed lines). In some instances, as denoted by the dashed lines, the free end 58 may extend into the fluid passage 36 so as to obstruct and/or meter the flow of fluid 46. In other instances, as denoted by the solid lines, the free end 58 may not extend into the fluid passage 36. The shape and metering effect of the second element 54 may be dependent on any number of factors, including, but not limited to, a load condition, an ambient temperature, a component temperature, or the like. For example, the second element 54 may change shape so as to gradually meter (e.g., increase or decrease) the fluid flow 46 as a load condition changes or an ambient temperature condition changes.

In an embodiment, the first element 48 and/or the second element 54 may each include a configuration that resembles a generally arcuate shape. In another embodiment, the first element 48 and the second element 54 may independently or collectively meter the flow of fluid 46 within the fluid passage 36. In yet another embodiment, the first element 48 and the second element 54 may include similar or dissimilar transition temperatures and/or transition profiles. In this manner, the shape and metering effect of the first element 48 and the second element 54 may be the same or different at various load conditions and temperature conditions.

Any number of shape memory alloy valves 44 may be disposed within each of the fluid passages 36. Moreover, the shape memory alloy valves 44 may include any number of elements and/or configurations. For example, the shape memory alloy valves 44 may be any configuration so as to meter and/or control the fluid flow 46 within the fluid passages 36. That is, any mechanism or device that is configured to change shape to meter the flow of fluid 46 within the fluid passage 36 based on a load condition and/or temperature condition is within the scope of this disclosure. Further, one or more of the shape memory alloy valves 44 may be configured to change shape in a similar or dissimilar manner about various locations on the rotor wheel at different load conditions and temperature conditions.

Shape memory alloys are materials that may change shape, stiffness, position, natural frequency, and other mechanical characteristics in response to, for example, temperature. Shape memory alloys are smart materials that may change shape based on a temperature due to changes in their microstructures, i.e., austenite and martensite. Shape memory alloys can be manufactured for unidirectional or bidirectional applications.

Figure 4:
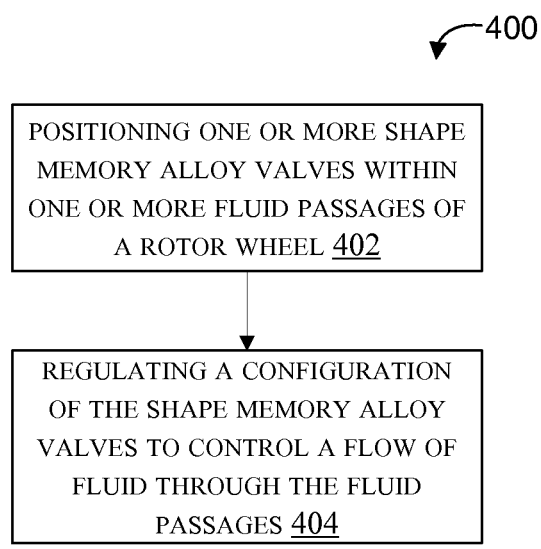
FIG. 4 is an example flow diagram of a method, according to an embodiment.

FIG. 4 illustrates an example flow diagram of a method 400 for controlling a flow of fluid through a fluid passage between adjacent impeller vanes. In this particular embodiment, the method 400 may begin at block 402 of FIG. 4 in which the method 400 may include positioning one or more shape memory alloy valves within one or more fluid passages of a rotor wheel. The method may also include regulating a configuration of the shape memory alloy valves to control a flow of fluid through the fluid passages.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A gas turbine system, comprising:
   a rotor wheel;
   a plurality of impeller vanes radially disposed on the rotor wheel;
   a plurality of fluid passages defined by adjacent impeller vanes such that the plurality of fluid passages are radially disposed across the rotor wheel; and
   one or more shape memory alloy valves disposed within one or more of the plurality of fluid passages, the one or more shape memory alloy valves configured to change shape to control a flow of fluid through one or more of the plurality of fluid passages.

2. The system of claim 1, wherein the one or more shape memory alloy valves change shape in response to various load conditions of the gas turbine system.

3. The system of claim 2, wherein the various load conditions of the gas turbine system comprises one or more of a base-load or a part-load.

4. The system of claim 1, wherein the one or more shape memory alloy valves change shape in response to various ambient temperature conditions.

5. The system of claim 1, wherein the one or more shape memory alloy valves change shape in response to a temperature of the rotor wheel.

6. The system of claim 1, wherein the one or more shape memory alloy valves comprise:
   a first configuration above a transition temperature; and
   a second configuration below the transition temperature.

7. The system of claim 1, wherein the one or more shape memory alloy valves comprise:
   a first element comprising a fixed end secured to the respective fluid passage and a free end; and
   a first and second configuration based at least in part on a first transition temperature.

8. The system of claim 7, wherein the one or more shape memory alloy valves comprise:
   a second element disposed opposite of the first element, the second element comprising a fixed end secured to the respective fluid passage and a free end; and
   the second element comprising a first and second configuration based at least in part on a second transition temperature.

9. The system of claim 8, wherein the first or second configuration of the first or second element comprises a generally arcuate shape.

10. A gas turbine system, comprising:
    a rotor comprising a plurality of rotor wheels;
    a plurality of impeller vanes radially disposed on each of the rotor wheels;
    a plurality of fluid passages defined by adjacent impeller vanes such that the plurality of fluid passages are radially disposed across the rotor wheels; and
    one or more shape memory alloy valves disposed within one or more of the plurality of fluid passages, the one or more shape memory alloy valves configured to change shape to control a flow of fluid through one or more of the plurality of fluid passages.

11. The system of claim 10, wherein the one or more shape memory alloy valves change shape in response to various load conditions of the gas turbine system.

12. The system of claim 11, wherein the various load conditions of the gas turbine system comprises one or more of a base-load or a part-load.

13. The system of claim 10, wherein the one or more shape memory alloy valves change shape in response to various ambient temperature conditions.

14. The system of claim 10, wherein the one or more shape memory alloy valves change shape in response to a temperature of the rotor wheel.

15. The system of claim 10, wherein the one or more shape memory alloy valves comprise:
    a first configuration above a transition temperature; and
    a second configuration below the transition temperature.

16. The system of claim 10, wherein the one or more shape memory alloy valves comprise:
    a first element comprising a fixed end secured to the respective fluid passage and a free end; and
    a first and second configuration based at least in part on a first transition temperature.

17. The system of claim 16, wherein the one or more shape memory alloy valves comprise:
    a second element disposed opposite of the first element, the second element comprising a fixed end secured to the respective fluid passage and a free end; and
    the second element comprising a first and second configuration based at least in part on a second transition temperature.

18. The system of claim 17, wherein the first or second configuration of the first or second element comprises a generally arcuate shape.

19. A method of operating a gas turbine system, comprising:
    regulating a configuration of one or more shape memory alloy valves positioned within one or more fluid passages of a rotor wheel to control a flow of fluid through the one or more fluid passages, wherein the one or more fluid passages are formed between a plurality of adjacent impeller vanes such that the one or more fluid passages are radially disposed across the rotor wheel; and
    regulating the configuration of the one or more shape memory alloy valves between a first and second configuration based at least in part on a load or temperature condition of the gas turbine system.

20. The method of claim 19, wherein the load condition comprises one or more of a base-load or a part-load, and wherein the one or more shape memory alloy valves within the one or more fluid passages are configured to operate at different temperature ranges to regulate various operating temperatures and various loading condition ranges.

* * * * *